Oct. 18, 1966    C. I. BOHLEN ET AL    3,279,084
TRAILER AXLE MISALIGNMENT AND WHEEL RUNOUT INDICATOR AND METHOD
Filed Jan. 8, 1965    2 Sheets-Sheet 1
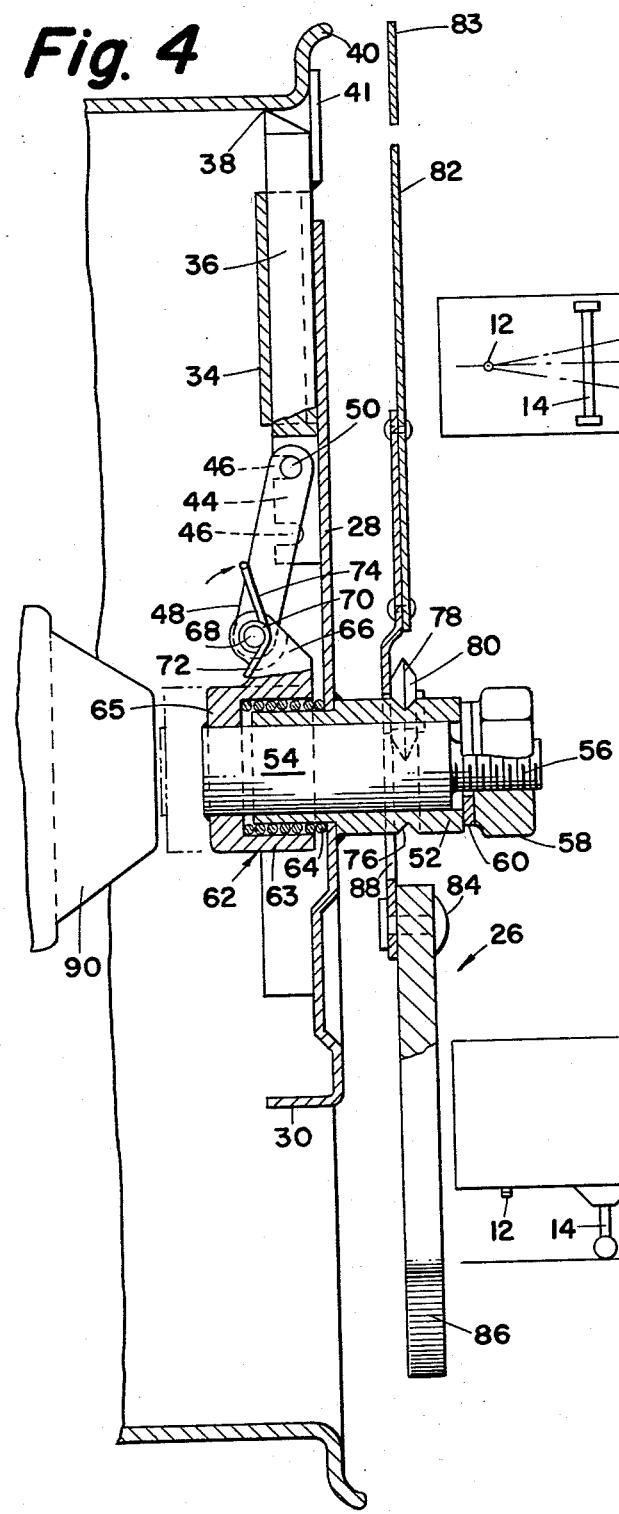
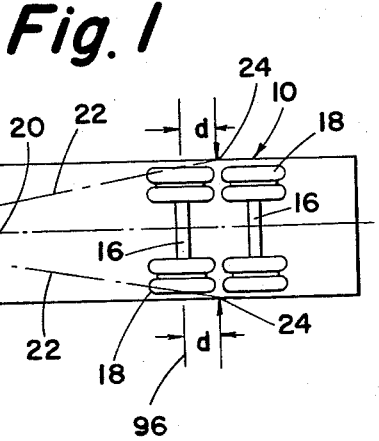
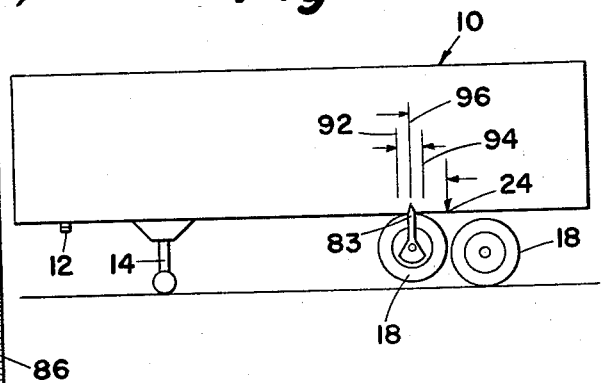
INVENTORS:
CHARLES I. BOHLEN
BY EUGENE HINDEN
Millman and Jacobs
ATTORNEYS

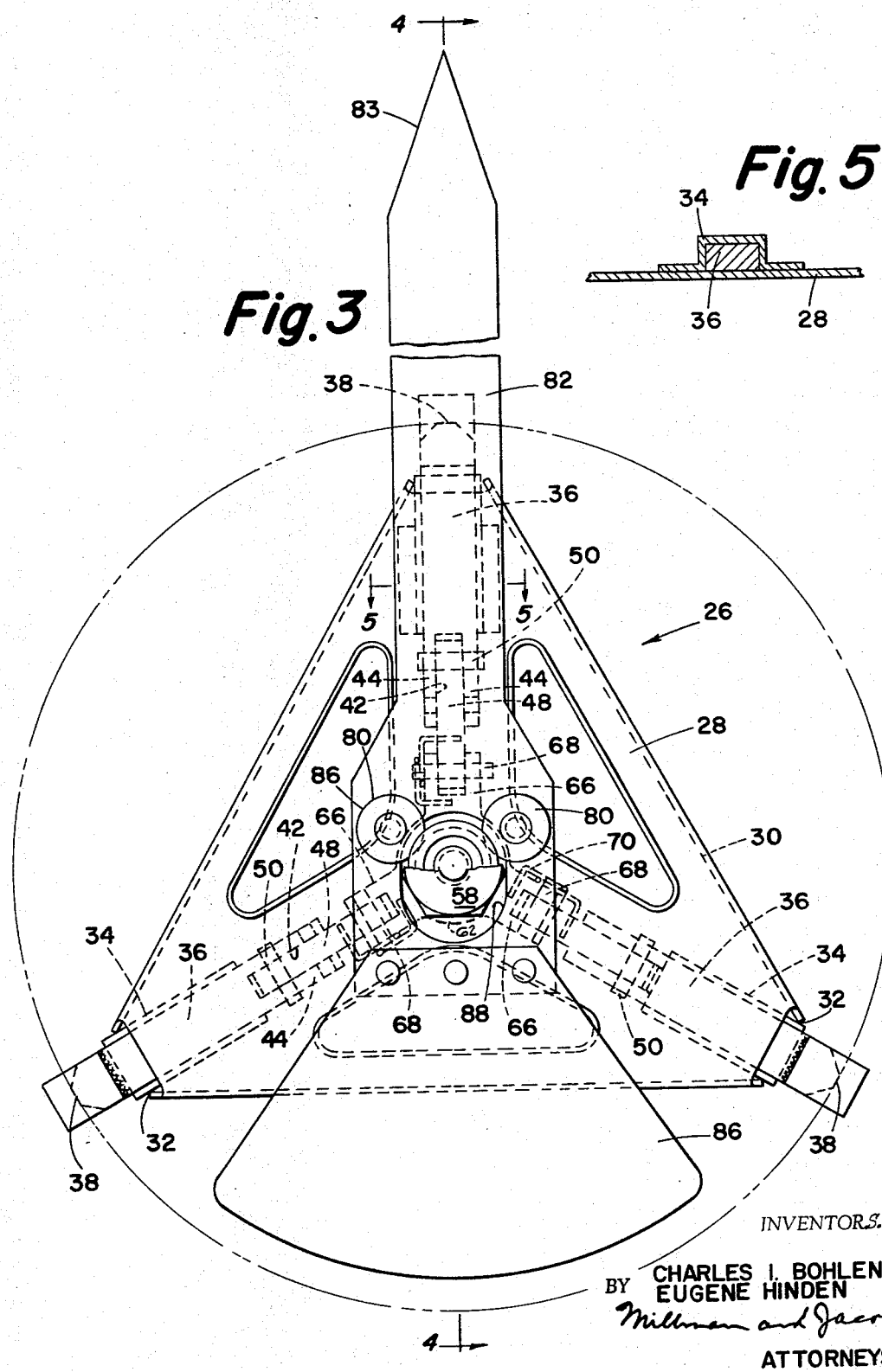

United States Patent Office 3,279,084
Patented Oct. 18, 1966

3,279,084
TRAILER AXLE MISALIGNMENT AND WHEEL RUNOUT INDICATOR AND METHOD
Charles I. Bohlen, Doylestown, and Eugene Hindin, Philadelphia, Pa., assignors to Strick Corporation, Fairless Hills, Pa., a corporation of Pennsylvania
Filed Jan. 8, 1965, Ser. No. 424,277
16 Claims. (Cl. 33—203)

This invention relates to a device and method useful in correcting excessive tire wear, hard pulling and/or dangerous mis-tracking due to axle misalignment when the axle is not truly perpendicular to the longitudinal axis of the vehicle and/or wheel runout when the wheel is eccentrically mounted on the axle.

The present methods of aligning vehicle axles are frequently troublesome, costly and time-consuming. A common method is to thread a cone or tube on each end of the axle, apply an adjustable extension to the kingpin which must engage the ground with perfect perpendicularity, apply a tape to a hook at the bottom of the kingpin extension and measure the distance from that point to each cone or tube. The axle is then adjusted so that the distance from each cone to the kingpin extension is equal, and subsequent axles are then adjusted on vehicle to be parallel to the first adjusted axle. Not only does this method require a kingpin extension and an adjustment of the same so that it is truly perpendicular to ground level, but the positioning of the cones or tubes on the threaded ends of the axles first requires the removal of the hub caps which, in certain types of vehicles, causes the loss of oil associated with the wheel which must then be replaced after the measurement has been completed.

The primary object of the invention is to provide an axle misalignment indicator which overcomes the disadvantages of the aforementioned methods because it can be readily attached to the rim of the wheel and requires no use of cones, a kingpin extension or tapes from the kingpin extension to the kingpin to measure the misalignment.

A further object of the invention is to provide an axle misalignment indicator which can also be used to accurately indicate wheel runout or compensate for the latter when it is of magnitude insufficient to warrant remounting of a different wheel to correct for excessive eccentricity.

Another object of the invention is to provide a method of measuring axle misalignment which employs reference or datum points marked on the vehicle body when the axle is aligned at the factory thus taking advantage of the accurate factory alignment procedure without the necessity of repeating the same each time realignment is required after the vehicle has been in service for some time.

Another object of the invention is to provide an axle misalignment and wheel runout indicator which includes means to adjustably mount the same on rotating elements or wheels of different diameters.

Another object of the invention is to provide an axle misalignment and wheel runout indicator which includes means causing the same to center itself on the rotating element or wheel at all times.

Another object of the invention is to provide an axle misalignment and wheel runout indicator which includes a spindle, means mounting said spindle on the rotating element or wheel, a pendulum pointer and improved antifriction means mounting the pointer on the spindle for free swinging movement thereon so that the pointer will always remain truly upright.

Another object of the invention is to provide an axle misalignment and wheel runout indicator which is relatively inexpensive, easy to mount on wheels and easy to operate.

These and other objects of the invention will become more apparent as the following description proceeds in conjunction with the accompanying drawings, wherein:

FIG. 1 is a diagrammatic bottom plan view of a vehicle illustrating the first step in the alignment procedure;

FIG. 2 is a diagrammatic side view of a vehicle with the device of the instant invention applied to one wheel and ready for measurement;

FIG. 3 is an enlarged side elevational view of the device;

FIG. 4 is a vertical sectional view taken on the line 4—4 of FIG. 3; and

FIG. 5 is a sectional view taken on the line 5—5 of FIG. 3.

Specific reference is now made to the drawings wherein similar reference characters are used for corresponding elements throughout.

Indicated generally at 10 is a vehicle body such as a semi-trailer to whose underside is secured a kingpin 12, landing gear 14 and one or more axles 16 which are suspended from the body by conventional springs (not shown) the axles being equipped with wheels 18. In order that the wear on the tires be even and the tracking be proper, the axles must be perpendicular to the longitudinal axis 20. This is accomplished in the factory by extending a tape from the kingpin to points at the end of the axle and adjusting the axle position until the legs 22 of the tape are equal or form an isosceles triangle with the kingpin as the apex. Subsequent axles are then positioned in parallelism with the first adjusted axle.

After the vehicle has been in service for some time, the axle frequently becomes misaligned in the sense that it is no longer perpendicular to the longitudinal axis 20 of the vehicle thereby causing excessive tire wear, hard pulling and mis-tracking. The device of the instant invention is used to indicate this misalignment accurately and easily. The device is used in association with reference or datum marks 24 which are permanently stamped on the bottom and at each side of the trailer body directly over the wheel locations. These marks are measured from the kingpin to form an isosceles triangle, the legs 22 of which pass through but beyond the points on the axle as previously mentioned to the sides of the trailer body so that the width of the body becomes the base of the triangle.

The device, shown generally as 26, comprises an equilateral triangular metallic spider 28 having an inwardly extending peripheral stiffening flange 30 which is discontinued at the apexes, as at 32. Secured to the inner face of the spider and opening through each apex is a channel guide 34. Slidable in each guide is a finger 36 whose outer end is hardened and tapered to form a knife-edge 38 adapted to bite through grime and accumulated dirt and grip the inside of the rim 40 of the wheel 18 or equivalent rotating element. The end of the finger carries a member 41 which engages the rim and acts as a limiting stop.

The inner end of each finger 36 includes a longitudinal slot 42 forming bifurcations 44 in whose surfaces are provided spaced transversely aligned arcuate open grooves 46, see FIG. 4. A link 48 is provided which extends into the slot 42 between the bifurcations 44 and carries a cross pin 50 for selective engagement in one or the other groove 46 for a purpose later to appear.

A spindle unit is provided which consists of a tubular member 52 that is welded to and extends perpendicularly of the plane of the spider and a spindle or stub shaft 54 which is journaled therein. One end of the shaft is reduced and extends beyond the tubular member 52 where it is threaded as at 56 to receive a knurled knob or hand wheel 58, there being a washer 60 between the knob and the end of the tubular member.

Secured as by welding to the other end of the shaft 54 is a hollow cylindrical hub 62 which also embraces the corresponding end of the member 52, there being a coil spring 64 which is interposed between the tubular member 52 and the inner surface of the peripheral wall 63 of the hub which bears terminally against the inner surface of the end wall 65 of the hub and the spider 28 and urges the hub outwardly of the spindle.

The hub includes pairs of ears 66 which are circumferentially spaced 120° apart, each link 48 being received in each pair of ears and there pivoted about a horizontal pin 68. A spring 70 is wound around the pin 68 and has ends 72 and 74, see FIG. 4, which bear respectively against the hub and the link to urge the pin 50 positively into the selected groove 46. The connection between the hub link and finger creates a toggle linkage with great mechanical advantages.

Cut into the exterior of the tubular member 52 adjacent its outer end is a V-groove 76 which receives the V-shaped knife edges 78 of a pair of rollers 80. The rollers are mounted for rotation around horizontal axes upon a pendulum member which includes an upper substantially flat member 82 whose upper end terminates in a pointer 83 and to whose lower end is secured as at 84 a weighted sectoral member 86. The rollers 80 are secured to the pendulum above the weighted member 86 and extend partially into a hole 88 in the pendulum which exceeds the outer diameter of the spindle 52 so that the pendulum can be easily assembled on the spindle and when allowed to lower, the knife edges 78 of the rollers will engage in the V-groove 76 of the tubular member so that an anti-friction engagement is provided to permit the pendulum to swing freely and always attain an upright position. To improve this free swinging action and reduce friction still further, the angle of the V-groove 76 exceeds the included angle of the knife edge 78 so that there will always be knife edge connection between the rollers and the groove.

In use, with the pendulum-pointer removed, the operator can readily reach the links 48, pull them out and insert their pins 50 in a selected one of the grooves 46. The effect of the construction is to shorten or retract the fingers 36 since the spring 64 acts to push the hub 62 and hence the lower ends of the links 48 away from the spider. Thus, if the operator wishes to mount the spider on a smaller diameter rim, he will insert the pins 50 in the lower grooves 46 and if he wishes to mount it on a larger diameter rim, he will insert the pins 50 in the upper grooves 46. One axle 16 is jacked up off the ground so that the wheels 18 will be free to rotate and the spider is positioned against a wheel at one end of the axle with the hub 62 opposite the wheel hub 90. By turning the knob or hand wheel 58 in a clockwise direction, the hub 62 is drawn towards the spider thereby extending the links 48 and causing the fingers 36 to move outwardly until the knife edges 38 grip the inner surface of the rim 40. The gripping action is strong and positive because the connections between the links 48, the hub 62 and the fingers 36 produce a toggle action.

The pendulum-pointer is then mounted on the tubular member 52 and swings freely thereon so that the pointer 83 is always truly upright. The wheel is then spun and if there is eccentricity in the wheel due to wheel runout, the pointer 83 will move in translation fore and aft between points 92 and 94, the distance between them indicating the actual wheel runout. If it is substantial, the wheel should be remounted before the axle alignment operation is completed. The true centroid is established by taking the average or median position 96 between the extreme fore and aft positions 92 and 94, marking it on the side of the vehicle body, and measuring the distance d from the point 96 and the original datum point 24. This procedure is repeated for the other end of the same axle and the measured distances d are compared, which comparison will indicate whether the axle is misaligned, in what direction and to what extent. Removal of the device from the wheel can be as easily accomplished as its mounting, and this is effected by simply turning the knob in a counter-clockwise direction to retract the fingers 36 until the knife edges 38 clear the rim.

While a preferred embodiment of the invention has here been shown and described, it will be understood that skilled artisans may make minor variations without departing from the spirit of the invention and the scope of the appended claims.

We claim:

1. For use with a vehicle including a body, an axle mounting wheels and datum marks on the body adjacent the ends of the axle and on a line perpendicular to the longitudinal axis of the vehicle; an axle misalignment and wheel runout indicator comprising a spindle unit, means removably mounting said spindle unit to the rim of the wheel so that it extends axially of the wheel and substantially equidistant from the rim, an elongated indicator member having a pointer on one end and a weight on the other forming a pendulum, and means mounting said indicator member for swinging movement on said spindle unit so that said pointer remains upright whereby when the wheel is rotated on the axle, movement of the pointer in translation between extreme points will indicate the extent of wheel runout and comparison of the distance between the pointer at the median between said extreme points and each of said datum marks will indicate the extent and direction of axle misalignment.

2. The combination of claim 1 wherein said means mounting said indicator member includes a V-groove circumferentially around said spindle unit, and spaced rollers mounted on said indicator member having knife edges received in said V-groove to minimize friction between said rollers and said spindle unit.

3. The combination of claim 2 wherein the angle of each of said knife edges is less than the included angle of said V-groove.

4. The combination of claim 2 wherein said indicator member is provided with a hole sufficiently larger than the diameter of said spindle unit to allow removable assembly of said indicator member and associated rollers on said spindle unit.

5. The combination of claim 1 wherein said spindle unit includes a tube and a shaft journaled therein, and said spindle unit mounting means includes a spider secured to said tube, wheel rim gripping fingers and means slidably mounting said fingers on said spider about 120° apart for movement radially to and from said spindle unit.

6. The combination of claim 5 wherein said fingers include knife edges at one of their ends for engaging the wheel rim.

7. For use with a vehicle including a body, an axle mounting wheels and datum marks on the body adjacent the ends of the axle and on a line perpendicular to the longitudinal axis of the vehicle; and axle misalignment and wheel runout indicator comprising a spindle unit including a tube and a shaft journaled therein, a spider secured to said tube in a plane substantially perpendicular to the axis of the tube, gripping fingers slidably mounted on said spider for movement radially to and from said spindle unit, a hub secured to said shaft and embracing said tube, links terminally pivoted to said hub and said fingers, an elongated indicator member having a pointer on one end and a weight on the other forming a pendulum, and means mounting said indicator member for swinging movement on said tube so that said pointer remains upright whereby when the wheel is rotated on the axle, movement of the pointer in translation between extreme points will indicate the extent of wheel runout and comparison of the distance between the pointer at the median between said extreme points and each of said datum marks will indicate the extent and direction of axle misalignment.

8. The combination of claim 7 and resilient means urging said hub away from said spider thereby acting to retract said fingers towards said spider unit.

9. The combination of claim 7 and means pivoting said links removably and in adjusted positions on said fingers.

10. The combination of claim 9 and resilient means urging said links into pivotal engagement with said fingers.

11. For use with a vehicle including a body, an axle mounting wheels and datum marks on the body adjacent the ends of the axle and on a line perpendicular to the longitudinal axis of the vehicle; an axle misalignment and wheel runout indicator comprising a spindle unit including a tube and a shaft journaled therein, a spider secured to said tube in a plane substantially perpendicular to the axis of the tube, gripping fingers slidably mounted on said spider for movement radially to and from said spindle unit, a hub secured to said shaft and embracing said tube, links terminally pivoted to said hub and said fingers, resilient means acting to retract said fingers towards said spindle unit, adjustable means to cause said fingers to extend or move away from said spindle towards the wheel rim gripping position, an elongated indicator member having a pointer on one end and a weight on the other forming a pendulum, and means mounting said indicator member for swinging movement on said tube so that said pointer remains upright whereby when the wheel is rotated on the axle, movement of the pointer in translation between extreme points will indicate the extent of wheel runout and comparison of the distance between the pointer at the median between said extreme points and each of said datum marks will indicate the extent and direction of axle misalignment.

12. The combination of claim 11 wherein said adjustable means includes threads at the end of said shaft opposite said hub and a nut rotatably engaging said threads.

13. The combination of claim 11 and means pivoting said links removably and in adjusted positions on said fingers.

14. A method of determining misalignment of a wheeled axle relative to the longitudinal axis of a vehicle and wheel runout comprising applying datum marks on the vehicle adjacent the axle and on a line perpendicular to the longitudinal axis of the vehicle, raising the axle so that the wheels are off the ground, clamping a spindle to the rim of one wheel so that it extends axially of the axle and equidistantly from the rim of the wheel, mounting a weight pointer for swinging movement on the spindle so that the pointed end is always upright, rotating the wheel to observe the extremes of translatory movement of said pointer and thereby determine the extent of wheel runout, marking the median point of said extremes on the vehicle, measuring the distance between the median point and a corresponding datum mark on the vehicle, repeating the procedure for the other wheel on the axle and comparing the distances between each datum mark and each median point to determine the extent and direction of axle misalignment.

15. A method of determining misalignment of a wheeled axle relative to the longitudinal axis of a vehicle comprising applying datum marks on the vehicle adjacent the axle and on a line perpendicular to the longitudinal axis of the vehicle, raising the axle so that the wheels are off the ground, clamping a spindle to the rim of one wheel so that it extends axially of the axle and inwardly of the rim of the wheel, mounting a weighted pointer for swinging movement on the spindle so that the pointed end is always upright, rotating the wheel to determine the median point of said pointer between extremes in translatory movement thereof, measuring the distance between the median point and a corresponding datum mark on the vehicle, repeating the procedure for the other wheel on the axle and comparing the distances between each datum mark and each median point to determine the extent and direction of axle misalignment.

16. A method of determining runout of a wheel on an axle carried by a vehicle comprising raising the wheel off the ground, clamping a spindle to the rim of the wheel so that it extends axially of the axle and equidistantly from the rim, mounting a weighted pointer for swinging movement on the spindle so that the pointed end is always upright, and rotating the wheel to observe the extremes of translatory movement of said pointer and thereby determine the extent of wheel runout.

No references cited.

LEONARD FORMAN, *Primary Examiner.*